United States Patent Office 3,808,273
Patented Apr. 30, 1974

3,808,273
PROCESS FOR THE PRODUCTION OF ALKYLATED N,N'-DIPHENYLOXAMIDES
Evelyne Burdet, Mulhouse, France, and Kurt Hofer, Munchenstein, Basel-Land, Rudolf Moesch, Stein, Aargau, and Alfred Schilli, Reinach, Basel-Land, Switzerland, assignors to Sandoz Ltd., Basel, Switzerland
No Drawing. Filed Aug. 10, 1971, Ser. No. 170,660
Int. Cl. C07c 103/26
U.S. Cl. 260—559 S    11 Claims

ABSTRACT OF THE DISCLOSURE

This invention relates to a process for the production of the alkylated N,N'-diphenyloxamides of formula

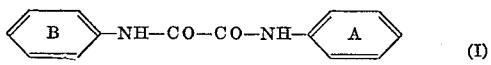

in which 1 to 4 secondary or tertiary alkyl radicals having 3 to 20 carbon atoms are bound to the nuclei A and/or B and the nuclei A and B may additionally contain hydroxyl groups and/or hydrocarbon radicals having 1 to 20 carbon atoms which may be bound through oxygen or sulphur atoms. These compounds absorb ultraviolet rays and protect light-sensitive organic materials, notably plastics, from the detrimental action of this radiation.

---

This invention relates to a process for the production of alkylated N,N'-diphenyloxamides of the formula

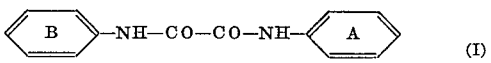

in which 1 to 4 secondary or tertiary alkyl radicals having 3 to 20 carbon atoms are bound to the nuclei A and/or B and the nuclei A and B may additionally contain hydroxyl groups and/or hydrocarbon radicals having 1 to 20 carbon atoms which may be bound through oxygen or sulphur atoms. This new process is characterized by the alkylation, in the presence of sulphuric acid, of 1 mol of a compound of the formula

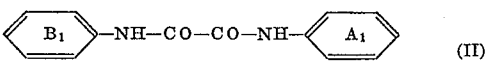

in which the nuclei $A_1$ and/or $B_1$ may contain hydroxyl groups and/or hydrocarbon radicals having 1 to 20 carbon atoms which may be bound through oxygen or sulphur atoms, with 1 to 4 mols of an olefin having 3 to 20 carbon atoms, or a secondary or tertiary alcohol. Employing this reaction, N,N'-diphenyloxamides alkylated in the nucleus are obtained in very good yield. This is surprising since in the analogous reaction of other N-phenylamides, for example N-phenylacetamide, no or very little nucleo-alkylated amide is obtained. The difference is probably due to the fact that the amides of Formula II, in contrast to other amides such as N-phenylacetamide, are stable under the reaction conditions.

A considerable number of starting compounds of the General Formula II are known. New members of the series can be easily synthesized by generally known methods. Each of the nuclei $A_1$ and $B_1$ in the General Formula II may be unsubstituted or substituted. The following substituents are suitable: the hydroxyl group, which preferably occurs only once in a benzene nucleus, straight or branched alkyl radicals such as methyl, ethyl, n-propyl, iso-propyl, n-butyl, iso-butyl, tert. butyl, iso-amyl, octyl, nonyl, dodecyl and octadecyl, cycloalkyl radicals such as the cyclohexyl radical, aryl radicals, in particular phenyl, aralkyl radicals such as the benzyl radical, alkoxy radicals such as methoxy, ethoxy, iso-propoxy, n-butoxy, n-hexoxy, n-octoxy, dodecyloxy and octadecyloxy, alkyl-mercapto radicals such as methylmercapto, ethylmercapto, butylmercapto, hexylmercapto and octylmercapto, aryloxy radicals such as phenoxy, and arylmercapto such as phenylmercapto.

The preferred substitutents on the nuclei $A_1$ and $B_1$ of the starting compounds of Formula II are hydroxyl groups, alkyl groups having 1 to 4 carbon atoms and alkoxy and alkylmercapto groups having 1 to 8 carbon atoms.

The alkylating agent may be chosen from the following: propene, 1-butene, 2-butene, iso-butylene, 2-methyl-1-butene, 2-methyl-2-butene, 3-methyl-1-butene, 1-pentene, 2-ethyl-1-butene, 3,3-dimethyl-1-butene, 1-hexene, 3-methyl-1-pentene, 4 - methyl-2-pentene, 2,4-dimethyl-2-pentene, 4,4-dimethyl - 1 - pentene, 2-heptene, 3-methyl-1-hexene, tripropylene, tetrapropylene, di-iso-butylene, tri-iso-butylene, 1-hexadecene, 1-heptadecene, 1-octadecene, 1-eicosene, iso-propanol, secondary butanol, tertiary butanol, 2-methyl-2-butanol, 2-pentanol, 3-pentanol, 2,3-dimethyl-2-butanol, 2-methyl-2-pentanol, 2-methyl-3-pentanol, 3-methyl-3-pentanol, 2,4-dimethyl-2-pentanol, 3-heptanol, 2-methyl-2-hexanol, 3-methyl-3-hexanol, 5-methyl-3-hexanol, 3-ethyl-4-hexanol, 2,2-dimethyl-3-hexanol, 3,4-dimethyl-3-hexanol, 2 - methyl-2-heptanol, 6-methyl-2-heptanol, 4-octanol, 2,3,4-trimethyl-3-pentanol, 2-methyl-2-octanol, 3-methyl-4-octanol, 5-nonanol, 3,6-dimethyl-3-octanol, 4-methyl-4-nonanol, 2,6,8 - trimethyl-4-nonanol, 2-nonadecanol.

The olefins and the secondary or tertiary alcohols containing 3 to 12 or more, especially 3 to 9, carbon atoms are given preference as alkylating agents so that the final products of Formula I bear preferably 1 to 4 secondary or tertiary alkyl radicals having 3 to 12 or in particular 3 to 9 carbon atoms.

In the present process sulphuric acid is used both as catalyst and as condensing agent. In order to be sufficiently effective it must be employed in highly concentrated form, i.e. of more than 90%, preferably 95–100% strength. Very low percentage oleum containing e.g. up to 5% sulphur trioxide, is also suitable. In order to prevent the decomposing action of the sulphuric acid on the oxamides to the greatest possible extent, it is advisable to dampen the activity of the acid by adding a diluent such as formamide, dimethyl formamide, ammonium sulphate, or one of the sulphates of alkylamines or primary alcohols. A highly suitable diluent or damping agent of this type is methanol, which is converted into methylsulphuric acid by sulphuric acid. When secondary or tertiary alcohols are employed as alkylating agents, water is split off in the reaction; it is therefore advisable to slowly add additional 100% sulphuric acid in the course of the reaction so that the freed water does not dilute the sulphuric acid too heavily. It is best to choose the amount and the concentration of sulphuric acid so that its total water content at the end of the reaction (from the methanol present, when used, and/or from the alcohol used for alkylating) does not exceed 15%. If oleum is used, it is advisable to set the reaction mixture with a diluent, e.g. a primary alcohol such as methanol, in a quantity sufficient to preclude sulphonation of the diphenyl oxamide. If it is desired to use oleum with e.g. 5–10% sulphur trioxide as catalyst, a primary alcohol such as methanol must be used to prevent sulphonation.

The decomposing action of sulphuric acid can be reduced by lowering the reaction temperature. The reaction can be carried out at temperatures ranging from about −30° C. to +50- C., the preferred temperature range being −10° C. to +15° C.

If Friedel-Crafts catalysts such as borofluoride etherate in place of sulphuric acid are employed for the reaction, the yields are substantially lower and the products of greatly inferior purity. Good results are obtained when, jointly with sulphuric acid, a second catalyst is employed, such as phosphoric acid, polyphosphoric acid, aluminium chloride, borofluoride, hydrogen fluoride or zinc chloride. However, the results obtained with sulphuric acid as sole catalyst are so good that the joint use of other, substantially dearer catalysts does not normally offer any advantages.

The compounds obtained by the new process described herein are accessible by way of a known process. In this process aniline or aniline derivatives are reacted with compounds yielding the oxalyl radical. The intermediates required for this route of synthesis are often difficult to obtain and expensive. In comparison, the present process provides a far more favorable route to compounds of Formula I.

The compounds of Formula I are suitable for use as protective agents against the action of visible light and ultra-violet radiation for organic materials sensitive to this action. The starting compounds of Formula II employed in this process are also protective agents against light, but their value as such is greatly enhanced by the process as the compounds alkylated in the benzene nucleus provide far more effective protection against light and radiation. For instance, it has been found that 2-ethyl-5'-tert.butyl-2'-ethoxy-N,N'-diphenyloxamide protects polyvinyl chloride and polypropylene more effectively from ultra-violet radiation than 2-ethyl-2'-ethoxy-N,N'-diphenyloxamide.

Another advantage of the compounds of Formula I is that they are more highly soluble in some of the organic materials that require protection of this nature, for instance polyalkylenes, and once fixed in the material are more resistant to migration than the new oxamides used as starting compounds in the process.

The present invention relates further to the use of the oxamides of Formula I as ultra-violet absorbers. For this purpose they are either incorporated in the materials for protection or applied to the surface of the material to form a protective film. By absorbing the detrimental ultra-violet rays they safeguard light-sensitive materials from degradation.

The oxamides produced by the present process can also be incorporated in suntan creams and lotions to absorb the ultra-violet radiation which causes erythema. But the suitable applications in plastics technology are far more numerous than in cosmetics and medicine. These oxamides can be used as protective additives in or on cellulose acetate, cellulose acetatebutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamine-formaldehyde resins, urea-formaldehyde resins, allyl casting resins, polymethyl methacrylate, polyesters and polyacrylonitrile. They can also be used to protect natural products such as rubber, cellulose, wool and silk. The material to be protected may be present in the form of film, sheet, rod, strip or panels, powders, granules, fibres or other solid forms, or as solutions, emulsions or dispersions.

The disclosed protective agents are incorporated in or applied to the materials by the known methods. One important method of application consists in mixing the oxamide of Formula I with the polymer, e.g. polypropylene granules, in a kneader or other suitable machine, with subsequent extrusion. In this way homogeneous mixing is achieved, which is important for satisfactory protection. The moulding material containing the agent can be extruded in various forms, such as film, tubing or filament which may be woven into textile fabric. In this method of application the UV-absorber is incorporated in the polymer before it is converted into textiles. Alternatively, formed textiles and fabrics can be treated with the compounds of Formula I, which in this case are applied from superfine dispersion in an aqueous or other suitable medium. This method is suitable for textiles of polyester and cellulose acetate fibres. The compounds of Formula I need not necessarily be added to the final polymers. They can if desired be incorporated in the monomers or prepolymers prior to the reaction giving the final polymer.

Besides clear films and the other aforenamed products, the oxamides produced by the disclosed process are suitable for stabilizing opaque, semi-opaque and translucent materials with a surface which is subject to degradation by ultra-violet radiation. Examples are foamed plastics, opaque films and coatings, opaque papers, transparent and opaque colored plastics, fluorescing pigments, automobile and furniture polishes, creams, lotions and the like, whether opaque, clear or translucent.

The compounds of Formula I can be employed in combination with other UV-absorbers or with stabilizers. These mixtures of active substances often have a synergic action and protect the treated materials simultaneously against ultra-violet radiation, heat and oxidative degradation.

In order to obtain protection against ultra-violet radiation it is essential to incorporate the new compounds in the material or to coat the material with them. Light-sensitive foods such as fruit, cooking fats and butter can be protected by storage in plastic film or sheet containing a compound of Formula I.

The present invention relates further to the materials which contain one of the new compounds of Formula I for protection against ultra-violet radiation. As stated in the foregoing, the oxamides can be incorporated in the materials at any stage of processing using the known methods; the amounts used may vary within wide limits, e.g. from 0.01 to 5%, preferably 0.05 to 1%, relative to the weight of the material to be protected.

In the following examples M.P. stands for the melting point, parts and percentages are by weight and the temperatures are in degrees centigrade.

EXAMPLES OF THE PROCESS OF PRODUCTION

Example 1

1000 parts of 100% sulphuric acid are run into 170 parts of methanol with vigorous stirring and cooling to —5° to 0°. Then 312 parts of 2-ethyl-2'-ethoxy-N,N'-diphenyloxamide are slowly added at —10° to —5°, followed slowly at the same temperature by 90 parts of tertiary butanol. The temperature is increased to +5° and the mixture reacted at this temperature for 6 hours with stirring. Subsequently it is extracted three times using 500 parts of chlorobenzene each time. The combined extracts are washed with 10% sodium carbonate solution, the chlorobenzene removed by steam distillation, and the distillation residue filtered and dried. A practically white crystalline mass is obtained in a yield of about 360 parts. It is readily pulverizable and its melting range is 107–126°. Its composition and constitution, as determined by gas chromatography, infra-red and nuclear resonance spectroscopy, is follows: approximately 80% 2-ethyl-5'-tert.butyl-2'-ethoxy-N,N'-diphenyloxamide and approximately 20% 2-ethyl-4,5'-(di-tert.butyl)-2'-ethoxy-N,N'-diphenyloxamide, with a very small amount of the starting oxamide.

If sulphuric acid of about 97% instead of 100% strength is used and 60 parts of tertiary butanol in place of 90, an approximately 93–95% monobutylation product is obtained, from which can be derived by re-crystallization, e.g. from iso-propanol, the pure 2-ethyl-5'-tert.-butyl-2'-ethoxy-N,N'-diphenyloxamide, which melts at 136–138°.

Alternatively, the amount of 100% sulphuric acid can be increased to 1200 parts and that of tertiary butanol to 150 parts, on which a product is formed containing 60–70% 2-ethyl-4,5'-di-(tert.butyl) - 2' - ethoxy-N,N'-diphenyloxamide, which crystallizes from cyclohexane and in the pure form melts at 91–92°.

The alkylated products obtained are more highly soluble at 20° in benzine of boiling point 100–120° than the starting compound:

| N,N'-diphenyloxamide | Solubility at 20° | |
|---|---|---|
| | Mg./l. | Percent |
| A 2-ethyl-2'-ethoxy-(starting compound) | 5,000 | 0.5 |
| B 2-ethyl-2'-ethoxy-5'-tert.butyl | 12,000 | 1.2 |
| C 2-ethyl-2'-ethoxy-4,5'-di-(tert.butyl) | >100,000 | >10 |
| 80% B } 20% C } | 15,000 | 1.5 |

Example 2

The procedure is as in Example 1, except that 70 parts of iso-butylene are added to the solution of the starting compound in methanol-sulphuric acid in place of tertiary butanol. A product is obtained which has virtually the same composition as that of Example 1.

Example 3

In place of tertiary butanol, the procedure of Example 1 is carried out with 150 parts of di-iso-butylene, the final product being obtained as a soft crystalline mass. It consists of approximately 70% 2 - ethyl-5'-tert.octyl-2'-ethoxy-N,N'-diphenyloxamide and about 30% 2-ethyl-4,5'-di-(tert.octyl) - 2 - ethoxy-N,N'-diphenyl-oxamide.

Example 4

300 parts of 100% sulphuric acid are allowed to flow slowly with thorough stirring at —10° to —15° into a mixture of 60 parts of 2-methyl-2'-ethoxy-N,N'-diphenyloxamide, 60 parts of tertiary butanol and 30 parts of formamide. Stirring is continued for 10 hours at —10° to —5°. The mixture is run onto ice and the precipitated product filtered, washed well with water, and vacuum dried. 87 parts of a soft crystalline mass are obtained, from which 2-methyl-5'-tert.butyl - 2' - ethoxy-N,N'-diphenyloxamide, melting point 126–128°, can be isolated by re-crystallization from dioxan.

Example 5

From the isomeric compound 4-methyl-2'-ethoxy-N,N'-diphenyloxamide, 4-methyl-5'-tert.butyl-2'-ethoxy-N,N'-diphenyloxamide, melting point 148–149°, is obtained in the same manner as in Example 4.

Example 6

At —10 to —5° 750 parts of 100% sulphuric acid are added slowly with good stirring and cooling to a mixture of 145 parts of 2-ethoxy-N,N'-diphenyloxamide, 150 parts of tertiary butanol and 100 parts of methanol. Stirring is continued for 6 hours at —5° to 0°. The reaction mixture is discharged onto ice and the precipitated crude product filtered and washed with water. Its melting range is 93–113°. Its composition determined by gas chromatography, infra-red and nuclear resonance spectroscopy is about 65% 5-tert.butyl-2-ethoxy-N,N'-diphenyloxamide and about 35% 5,4'-di-(tert.butyl)-2-ethoxy-N,N'-diphenyloxamide. These two compounds melt at 117–118° and 136–137° respectively.

Example 7

The reaction is carried out as in Example 1 using 2-ethyl-2'-(n-octyloxy) - N,N' - diphenyloxamide in place of 2-ethyl-2'-ethoxy - N,N' - diphenyloxamide. It gives 2-ethyl-5'-tert.butyl-2'-(n-octyloxy - N,N' - diphenyloxamide, melting point 70–71°.

Example 8

In a reaction vessel 30 parts of methanol are stirred, then 10 parts of ammonium sulphate are added. After cooling to —5 to 0° 210 parts of 100% sulphuric acid are added at this temperature, followed by 57 parts of 2,4-dimethyl-2'-hydroxy-N,N'-diphenyloxamide. In the next hour 40 parts of tertiary butanol are gradually added at —5° to —10°. The reaction mixture is stirred further for 8 hours at 0–5°. It is unloaded onto ice, giving a precipitate which is filtered, washed with sodium carbonate solution and water until free of sulphate ions, vacuum dried, and ground. 75 parts of crude 2,4-dimethyl-3',5'-di-(tert.butyl) - 2' - hydroxy-N,N'-diphenyloxamide in the form of a colorless powder are obtained, which after re-crystallization from iso-propanol melts at 152–155°.

Example 9

The procedure of Example 8 is followed, with the addition of 32 parts of iso-butylene in place of tertiary butanol. The same final product is obtained.

In the following Examples 10 to 15 the given starting compounds are reacted with tertiary butanol or iso-butylene as in Examples 8 and 9 to yield the named products which are distinguished by their melting points.

Example 10

2-ethyl - 2' - hydroxy-N,N'-diphenyloxamide→2-ethyl-5'-tert.butyl-2'-hydroxy-N,N'-diphenyloxamide, M.P. 160–163°.

Example 11

2-ethyl - 2' - hydroxy-N,N'-diphenyloxamide→2-ethyl-3',5'-di-(tert.butyl) - 2' - hydroxy-N,N'-diphenyloxamide, M.P. 103–106°.

Example 12

2 - hydroxy-N,N'-diphenyloxamide→5,4'-di-tert.butyl)-2-hydroxydiphenyloxamide, M.P. 162–164°.

Example 13

2,5 - dimethyl-2'-hydroxy-N,N'-diphenyloxamide→2,5-dimethyl-3',5'-di-(tert.butyl)-2'-hydroxy-N,N' - diphenyloxamide, M.P. 173–174°.

Example 14

2 - hydroxy-3'-ethylmercapto-N,N'-diphenyloxamide→3,5-di-(tert.butyl)-2-hydroxy - 3' - ethylmercapto-N,N'-diphenyloxamide, M.P. 176–180°.

Example 15

2,2' - dihydroxy-N,N'-diphenyloxamide→3,5,3',5'-tetra-(tert.butyl)-2,2'-dihydroxy-N,N'-diphenyloxamide, M.P. 222–226°.

In the following Examples 16 to 18 the starting compounds used in Examples 10 and 11 are reacted with the stated branched olefins to give the products named.

Example 16

Di-iso-butylene→2-ethyl-5'-tert.-octyl - 2' - hydroxy-N,N'-diphenyloxamide, M.P. 104–106°.

Example 17

Tripropylene→2-ethyl-5'-tert.nonyl-2'-hydroxy - N,N'-diphenyloxamide, M.P. 80–82°.

Example 18

Tetrapropylene→2-ethyl-5'-tert.dodecyl - 2' - hydroxy-N,N'-diphenyloxamide, a colorless viscous oil.

In the following Examples 19 to 22 the reaction is carried out as in Example 1 or 2 using 2-ethyl-2'-ethoxy-N,N'-diphenyloxamide and the stated alcohol or olefin.

Example 19

Iso-propanol→2-ethyl - 2' - ethoxy-4,3',5'-tri-isopropyl-N,N'-diphenyloxamide, a liquid mixture of isomers.

Example 20

Tertiary amyl alcohol→2-ethyl-2'-ethoxy-5'-tert.amyl-N,N'-diphenyloxamide, M.P. 98–100°.

Example 21

Heptene→2 - ethyl - 2' - ethoxy-5'-tert.heptyl-N,N'-diphenyloxamide, M.P. 75–78°.

Example 22

Tripropylene→2-ethyl - 2' - ethoxy-5'-isononyl-N,N'-diphenyloxamide, M.P. 84–87°.

In the following Examples 23 to 29 the procedure of Example 4 is employed with tertiary butanol.

Example 23

2 - ethoxy - 4' - tert.butyl-N,N'-diphenyloxamide→2-ethoxy-5,4'-di-(tert.butyl)-N,N' - diphenyloxamide, M.P. 136–137°.

Example 24

2-methoxy - 2' - methyl-N,N'-diphenyloxamide→2-methoxy-5-tert.butyl-2'-methyl-N,N'-diphenyloxamide, M.P. 144–145°.

Example 25

2-methoxy - 4' - methyl-N,N'-diphenyloxamide→2-methoxy-5-tert.butyl-4'-methyl-N,N'-diphenyloxamide, M.P. 177–179°.

Example 26

2-n-octyloxy - 2' - methyl-N,N'-diphenyloxamide→2-n-octyloxy - 5 - tert.butyl-2'-methyl-N,N'-diphenyloxamide, M.P. 83–85°.

Example 27

2-n-octyloxy - 4' - methyl-N,N'-diphenyloxamide→2-n-octyloxy - 5 - tert.butyl-4'-methyl-N,N'-diphenyloxamide, M.P. 96–98°.

Example 28

2-n-butoxy - 2' - ethyl-N,N'-diphenyloxamide→2-n-butoxy - 5 - tert.butyl-2'-ethyl-N,N'-diphenyloxamide, M.P. 69–71°.

Example 29

2-methoxy-4'-n-octylthio - N,N' - diphenyloxamide→2-methoxy-5-tert.butyl - 4' - n - octylthio-N,N'-diphenyloxamide, M.P. 75–80°.

EXAMPLES OF APPLICATION

Example A

Three samples of polypropylene, the first without a protective additive, the second containing 0.5% of the compound 2-ethyl-2'-ethoxy-N,N'-diphenyloxamide and the third 0.5% of 2-ethyl-5'-tert.butyl-2'-ethoxy-N,N'-diphenyloxamide, are exposed to light in the "Xenotest 450" apparatus. The time is determined at which the samples turn brittle, which is 300, 1500 and 2500 hours respectively. These findings show that although the oxamide used as starting compound in Example 1 is quite a good protective agent against light and ultra-violet radiation, alkylation in the benzene nucleus in accordance with the present invention transforms it into a far more effective compound.

Example B

Comparative tests with rigid polyvinyl chloride in place of polypropylene are carried out as in Example A. The samples show embrittlement after 800, 2000 and 4000 hours respectively.

Example C

Polypropylene containing homogeneously distributed therein 0.5% of the compound produced as in Example 7 is tested as given in Example A. It withstands exposure to xenon light for 3000 hours without becoming brittle.

Example D

The mixture of monobutylated and dibutylated oxamide produced as in Example 1 is incorporated in polyamide 6 in an amount of 0.3%. In exposure tests in the "Xenotest 450" apparatus a control sample of the material without the additive turns yellow and brittle after 3000 hours, whereas the sample containing the oxamide mixture withstands 8000 hours exposure without change.

Example E 0.5% of the compound named in Example 16 is incorporated in unstabilized polypropylene. Exposure tests alongside polypropylene without the additive show that it is much more resistant to the action of light and ultraviolet radiation. In tests for heat stability at 140° the first sample does not become brittle until after 14 days, whereas the unprotected sample is brittle after only one day's exposure.

Example F

In a high pressure polyethylene ("Lupolen 1810 H," registered trademark) 0.5% of the final product of Example 21 is incorporated by the normal method. Sheets of 0.3 mm. thickness are moulded with this material, with the same polyethylene containing 0.5% of the starting compound 2-ethyl-2'-ethoxy-N,N'-diphenyloxamide, and with polyethylene containing no additive. The sheets are exposed in the "Xenotest 450" apparatus until brittleness appears. The times that elapse before this effect appears are about 800 hours for the sample without additive, about 1500 hours for the one containing 0.5% of the starting compound, and about 3500 hours for the sample protected with 0.5% of the product of Example 21.

Moreover, migration to the surface ("blooming") of the starting compound is observable in the second sample, whereas this effect is absent in the one containing the product of Example 21.

Formulae of representative alkylated N,N'-diphenyloxamides are as follows:

Example 1

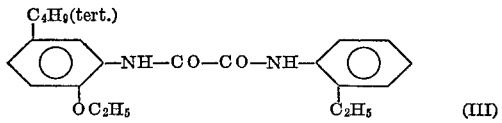

(III)

Example 7

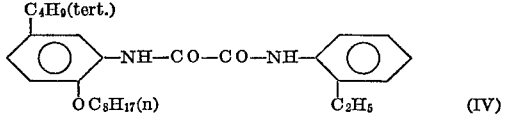

(IV)

Example 14

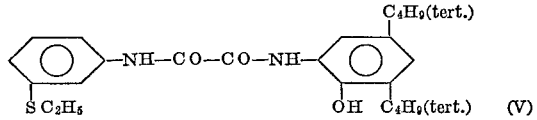

(V)

Example 15

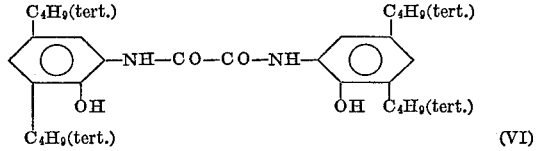

(VI)

Example 16

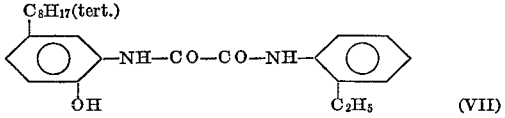

(VII)

Having thus disclosed the invention what is claimed is:

1. A process for the production of an alkylated phenyloxamide of the formula

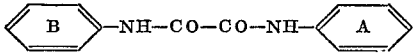

wherein one or both or rings A and B is substituted by 1 to 4 secondary or tertiary alkyl radicals having 3 to 20 carbon atoms and further unsubstituted or substituted by hydroxy and/or hydrocarbon radicals containing 1 to 20 carbon atoms bound directly or through an oxygen or sulphur atom to the ring, which process comprises alkyating a compound of the formula

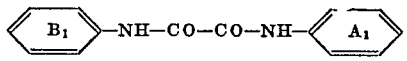

wherein one or both of rings A₁ and B₁ are unsubstituted or substituted by hydroxy and/or hydrocarbon radicals containing 1 to 20 carbon atoms bound directly or through an oxygen or sulphur atom to the ring, with 1 to 4 moles, per mole of Compound II, of an alkylating agent containing 3 to 20 carbon atoms and selected from the group consisting of olefins, secondary alcohols, and tertiary alcohols, in the presence of concentrated sulphuric acid and a reaction dampening agent selected from the group consisting of formamide, dimethyl formamide, ammonium sulfate, sulfates of alkylamines, and the sulfates of primary alcohols and at a temperature of $-30°$ to $+50°$ C.

2. A process according to claim 1 wherein the compound of Formula II contains no more than 1 hydroxyl group on each benzene nucleus.

3. A process according to claim 1 wherein the substituents on rings A₁ and B₁ are selected from the group consisting of hydroxy, alkyl of 1 to 4 carbon atoms, alkoxy of 1 to 8 carbon atoms, and alkylmercapto of 1 to 8 carbon atoms.

4. A process according to claim 1 wherein the alkylating agent contains 3 to 9 carbon atoms.

5. A process according to claim 1 which comprises alkylating a compound of Formula II wherein one or both of the rings A₁ and B₁ are unsubstituted or substituted by one or more members of the group consisting of hydroxyl, alkyl of 1 to 4 carbon atoms, alkoxy of 1 to 8 carbon atoms, and alkylmercapto of 1 to 8 carbon atoms, with 1 to 4 moles, per mole of Compound II, of an alkylating agent containing 3 to 9 carbon atoms and selected from the group consisting of olefins, secondary alcohols, and tertiary alcohols, at a temperature of $-30°$ to $+50°$ C. and in the presence of sulphuric acid of a concentration greater than 90% and a reaction dampening agent selected from the group consisting of formamide, dimethyl formamide, ammonium sulfate, the sulfates of alkylamines, and the sulfates of primary alcohols.

6. A process according to claim 1 wherein the alkylating agent is selected from the group consisting of propene, 1-butene, 2-butene, iso-butylene, 2-methyl-1-butene, 2-methyl-2-butene, 3-methyl-1-butene, 1-pentene, 2 - ethyl - 1 - butene, 3,3-dimethyl-1-butene, 1-hexene, 3-methyl - 1 - pentene, 4-methyl-2-pentene, 2,4-dimethyl-2-pentene, 4,4-dimethyl-1-pentene, 2-heptene, 3-methyl-1-hexene, tripropylene, tetrapropylene, di-iso-butylene, tri-iso-butylene, 1-hexadecene, 1-heptadecene, 1-octadecene, 1-eicosene, iso-propanol, secondary butanol, tertiary butanol, 2-methyl-2-butanol, 2-pentanol, 3-pentanol, 2,3-dimethyl-2-butanol, 2-methyl-2-pentanol, 2 - methyl - 3-pentanol, 3-methyl-3-pentanol, 2,4-dimethyl-2-pentanol, 3 - heptanol, 2 - methyl-2-hexanol, 3-methyl-3-hexanol, 5-methyl-3-hexanol, 3 - ethyl - 4 - hexanol, 2,2-dimethyl-3-hexanol, 3,4-dimethyl-3- hexanol, 2-methyl-2-heptanol, 6-methyl - 2-heptanol, 4-octanol, 2,3,4-trimethyl-3-pentanol, 2-methyl-2-octanol, 3-methyl-4-octanol, 5-nonanol, 3,6-dimethyl-3-octanol, 4-methyl-4-nonanol, 2,6,8-trimethyl-4-nonanol, and 2-nonadecanol.

7. A process according to claim 1 wherein the concentration of sulphuric acid is at least 90%.

8. A process according to claim 1 wherein the sulphuric acid contains up to 5% sulphur trioxide.

9. A process according to claim 1 wherein there is also present during the alkylation a compound selected from the group consisting of phosphoric acid, polyphosphoric acid, aluminum chloride, borofluoride, hydrogen fluoride and zinc chloride.

10. A process according to claim 5 wherein 2-ethyl-2'-hydroxy-N,N'-diphenyloxamide is alkylated with di-iso-butylene or tetrapropylene.

11. A process according to claim 5 wherein 2-ethyl-2'(n-octyloxy)-N,N'diphenyloxamide or 2-methoxy-4'-n-octylthio-N,N'-diphenyloxamide is alkylated with tertiary butanol.

References Cited
UNITED STATES PATENTS
3,529,982  9/1970  Leuthi et al. _____ 260—559

FOREIGN PATENTS
1,911,835  9/1969  Germany _____ 260—559
1,332,227  6/1963  France _____ 260—559

OTHER REFERENCES
Morrison et al.: Organic Chemistry, pp. 252–59, 287, 292 (Allyn & Bacon, Inc., Boston) (1959).

Yasue et al.: Chem. Abstracts, vol. 52, col. 6227d–h (1958).

HARRY I. MOATZ, Primary Examiner

U.S. Cl. X.R.

260—558 R; 558 S, 559 T, 45.9 R